(12) United States Patent
Araseki

(10) Patent No.: US 7,942,067 B2
(45) Date of Patent: May 17, 2011

(54) METHOD FOR MEASURING FLOW RATE FROM ELECTROMAGNETIC PUMP

(75) Inventor: Hideo Araseki, Chiba (JP)

(73) Assignee: Central Research Institute of Electric Power Industry, Tokyo (JP)

( * ) Notice: Subject to any disclaimer, the term of this patent is extended or adjusted under 35 U.S.C. 154(b) by 0 days.

(21) Appl. No.: 12/808,194

(22) PCT Filed: Jun. 17, 2009

(86) PCT No.: PCT/JP2009/002755
§ 371 (c)(1),
(2), (4) Date: Jun. 15, 2010

(87) PCT Pub. No.: WO2009/153984
PCT Pub. Date: Dec. 23, 2009

(65) Prior Publication Data
US 2010/0263454 A1    Oct. 21, 2010

(30) Foreign Application Priority Data

Jun. 19, 2008 (JP) ................. 2008-160611
Feb. 20, 2009 (JP) ................. 2009-037858

(51) Int. Cl.
G01F 1/58 (2006.01)
(52) U.S. Cl. .................................. 73/861.12
(58) Field of Classification Search ............... 73/861.12, 73/861.13, 861.17
See application file for complete search history.

(56) References Cited

U.S. PATENT DOCUMENTS

| | | | | |
|---|---|---|---|---|
| 4,195,515 A | * | 4/1980 | Smoll | 73/861.13 |
| 4,308,753 A | * | 1/1982 | Olson | 73/861.17 |
| 7,267,012 B2 | * | 9/2007 | Ara et al. | 73/861.12 |

FOREIGN PATENT DOCUMENTS

| | | |
|---|---|---|
| JP | 58-33965 A | 2/1983 |
| JP | 60-144614 A | 7/1985 |
| JP | 5-30725 A | 2/1993 |
| JP | 2001-119921 A | 4/2001 |
| JP | 3285894 | 5/2002 |

OTHER PUBLICATIONS

International Search Report of International Application No. PCT/JP2009/002755.

* cited by examiner

*Primary Examiner* — Jewel Thompson
(74) *Attorney, Agent, or Firm* — Notaro, Michalos & Zaccaria P.C.

(57) ABSTRACT

A method achieving a small spatial restriction and capable of simply measuring with high precision a flow rate of a conductive fluid of an electromagnetic pump is provided. In particular, the method is suitable in measuring a flow amount of each electromagnetic pump in an electromagnetic pump unit where a plurality of electromagnetic pumps are arranged in parallel in one pump vessel. The method includes: measuring, by a magnetic sensor such as a magnetic flux density measuring coil 6, arranged in the vicinity of a outlet end 2 of an electromagnetic pump 1, a magnetic flux density of a magnetic field 4 that is generated in the electromagnetic pump 1 and pushed out from the outlet end 2 of the electromagnetic pump 1 due to a flow of a conductive fluid 5; and measuring a flow amount of the electromagnetic pump 1 from a previously calculated relationship between the magnetic flux density of the magnetic field 4 pushed out from the outlet end 2 of the electromagnetic pump 1 and a flow amount of the conductive fluid 5.

4 Claims, 9 Drawing Sheets

[Fig. 1]
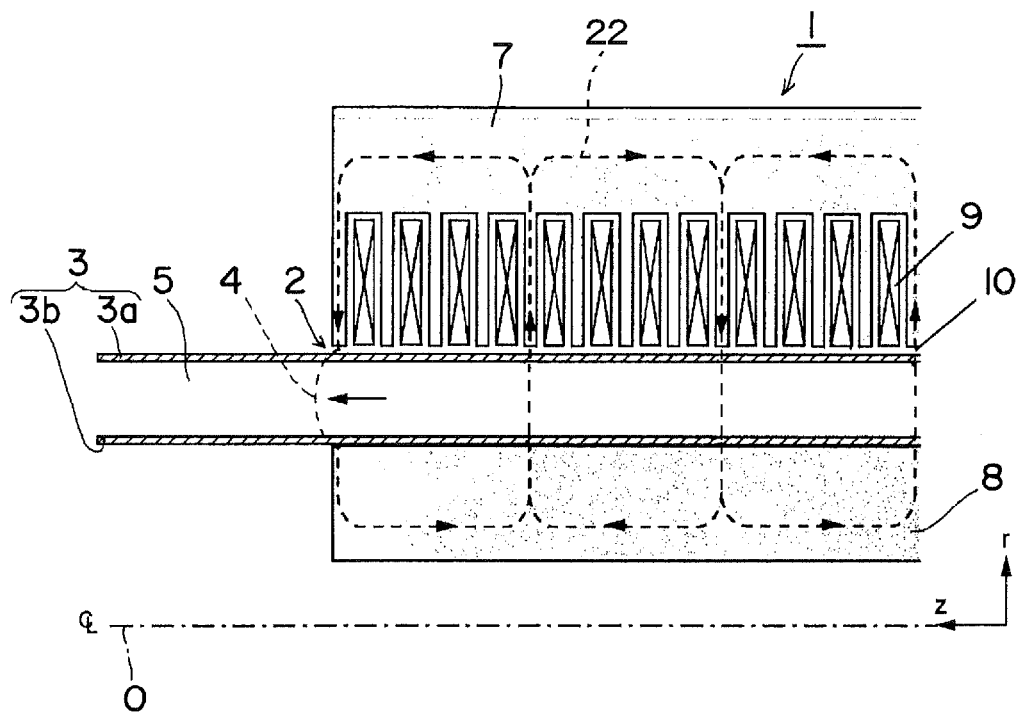
[Fig. 2]
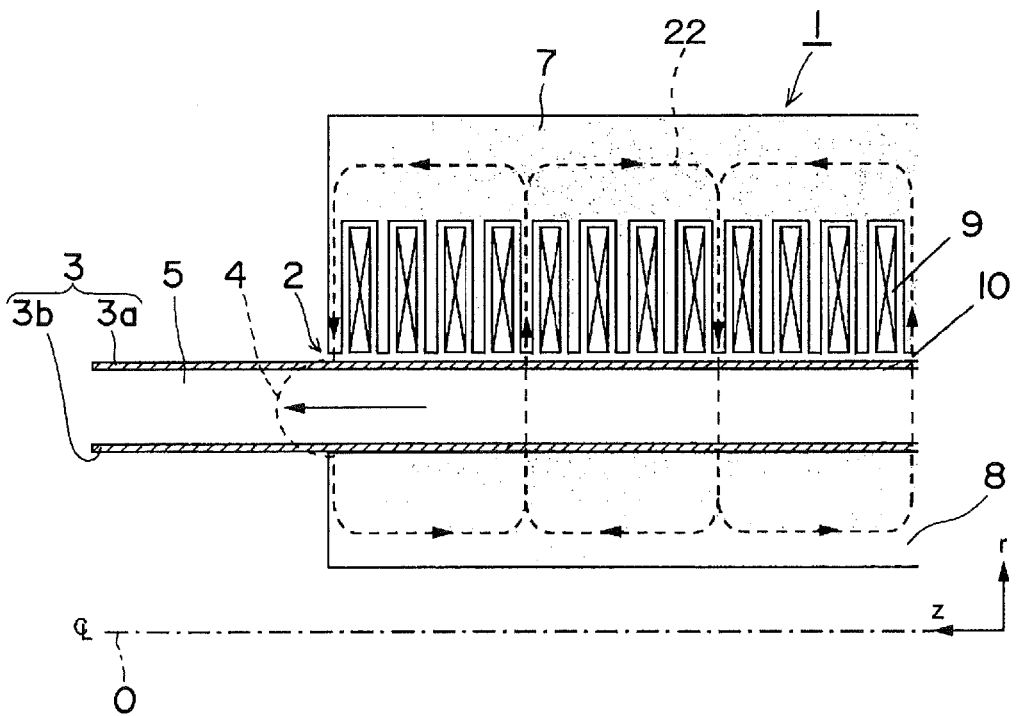

[Fig. 3]
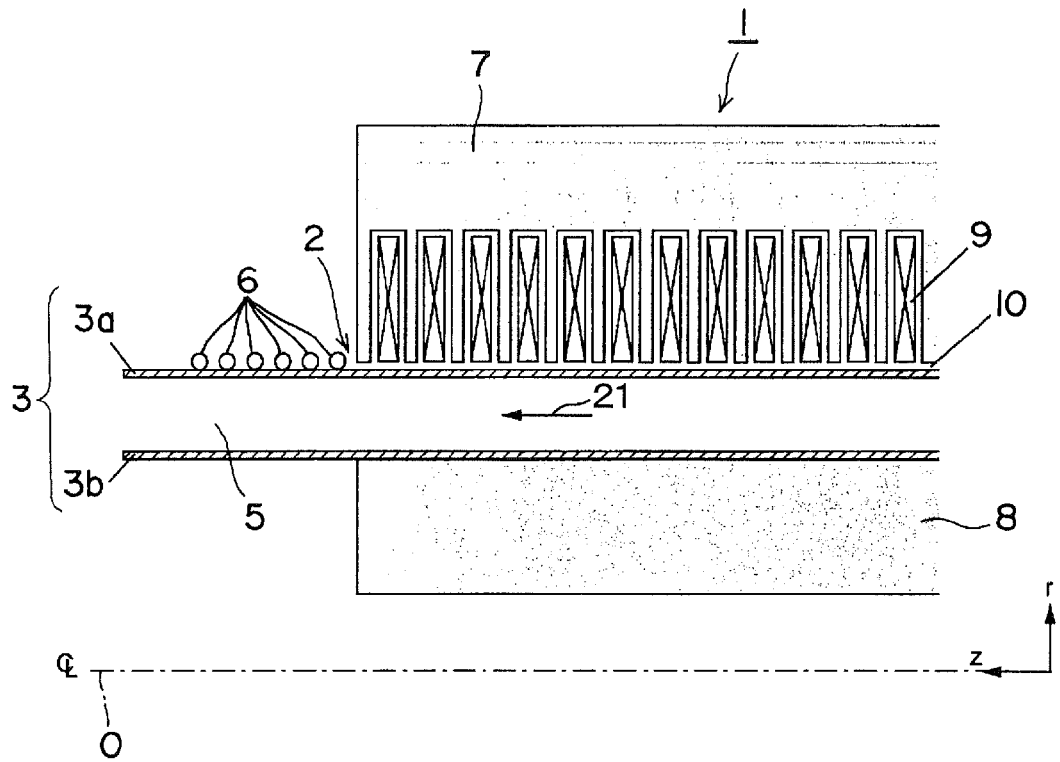
[Fig. 4]
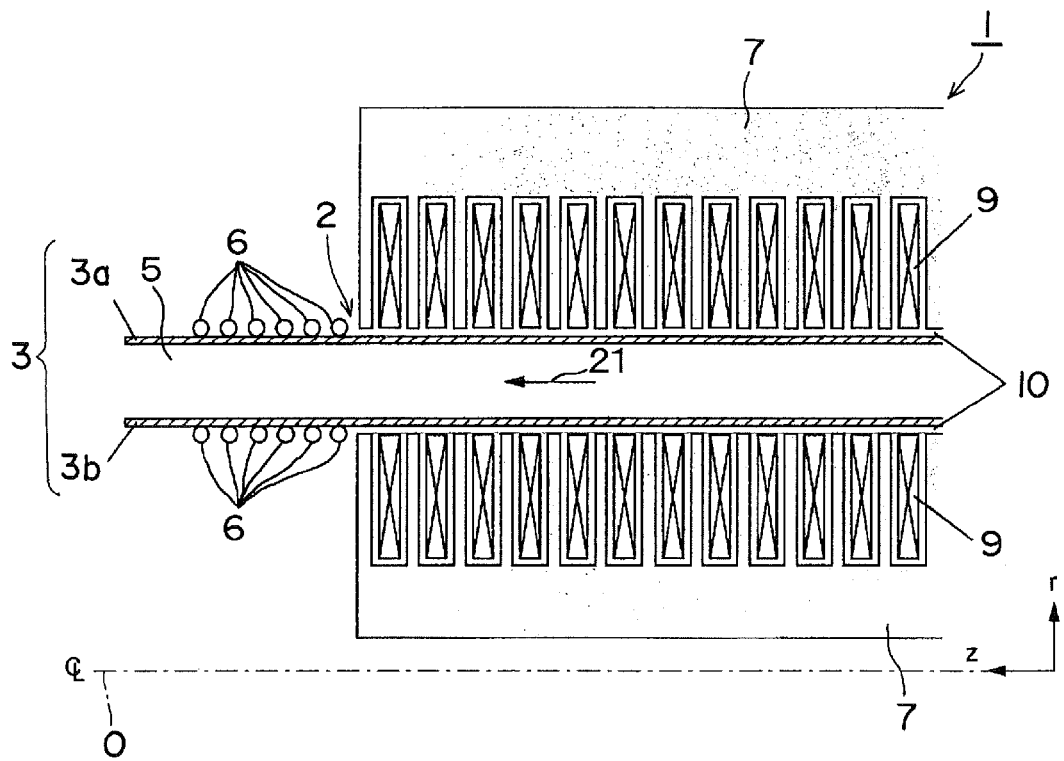

[Fig. 5]
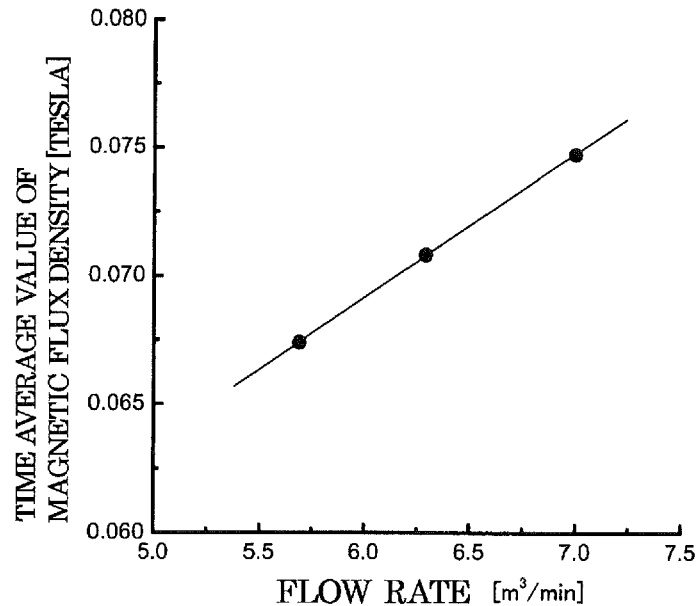
[Fig. 6]
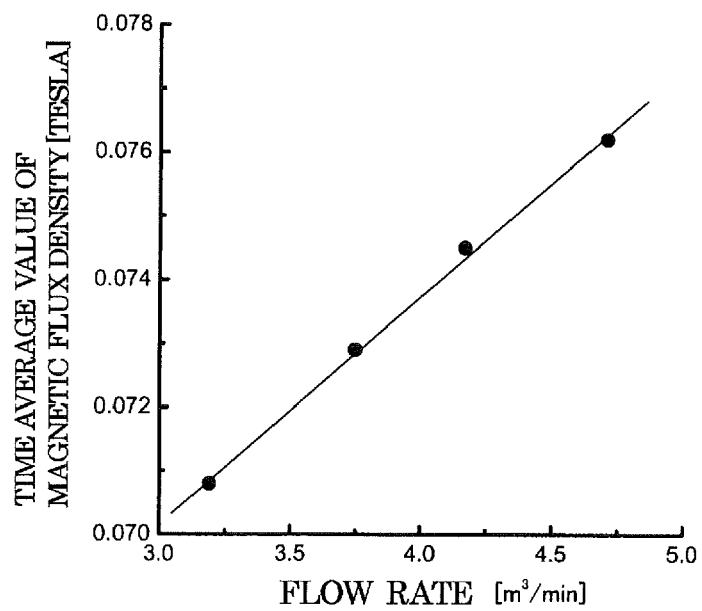

[Fig. 7]
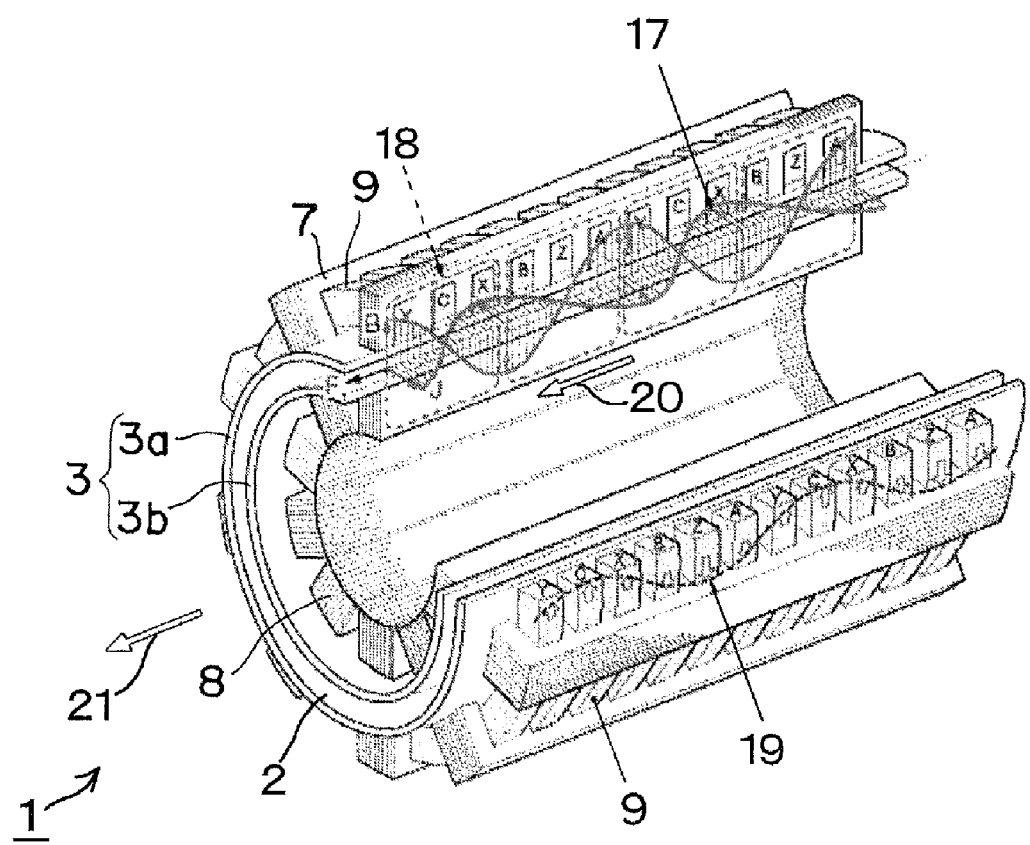

[Fig. 8]
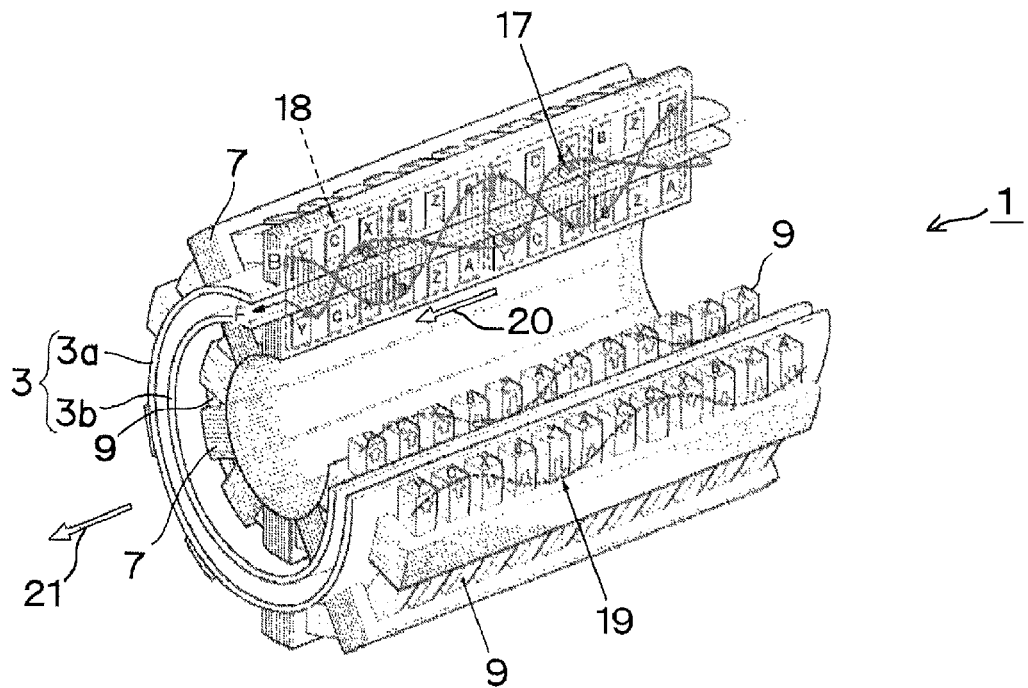
[Fig. 9]
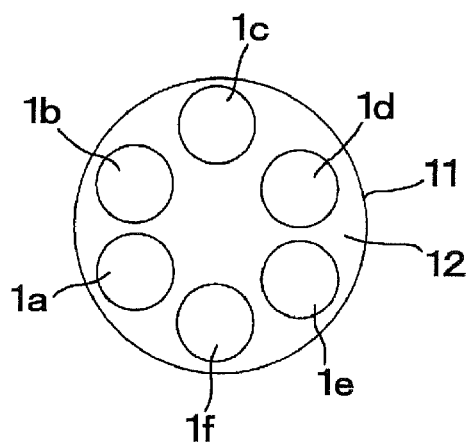

[Fig. 10]
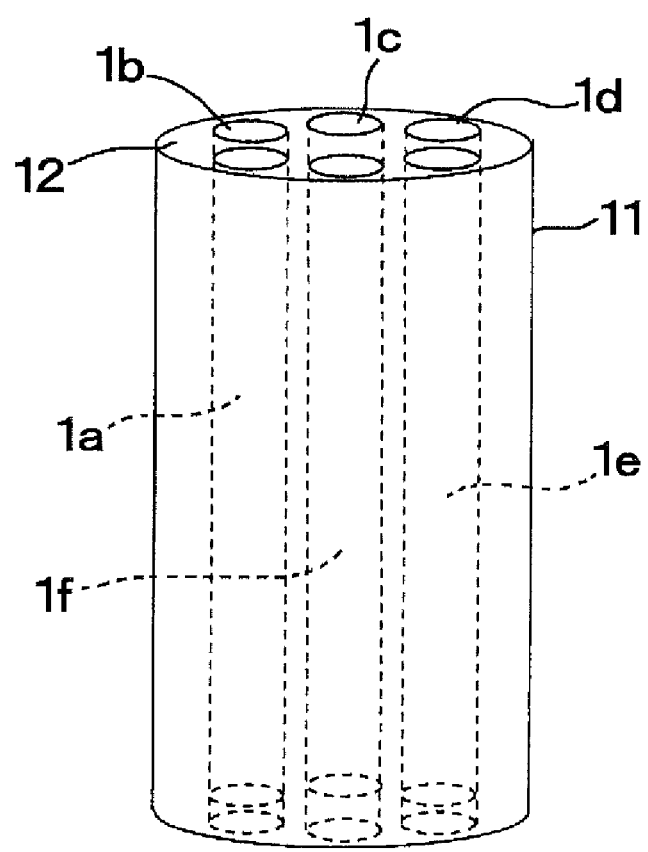

[Fig. 11]
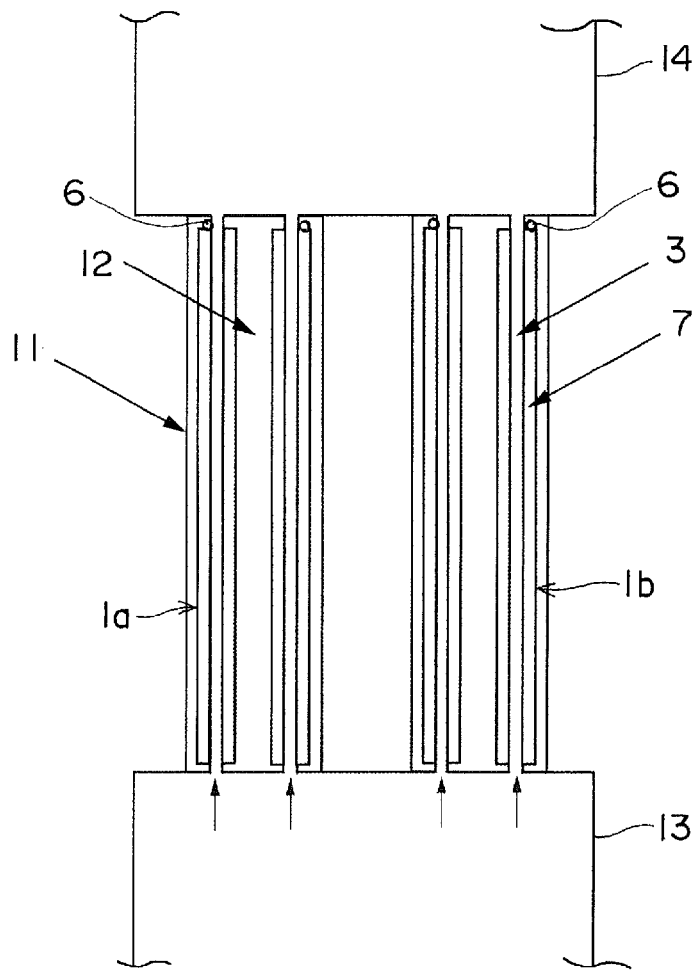
[Fig. 12]
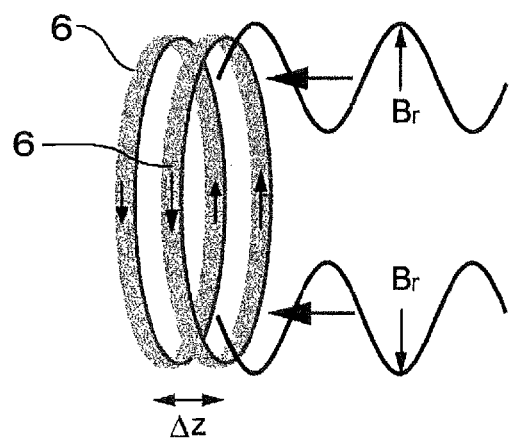

[Fig. 15]
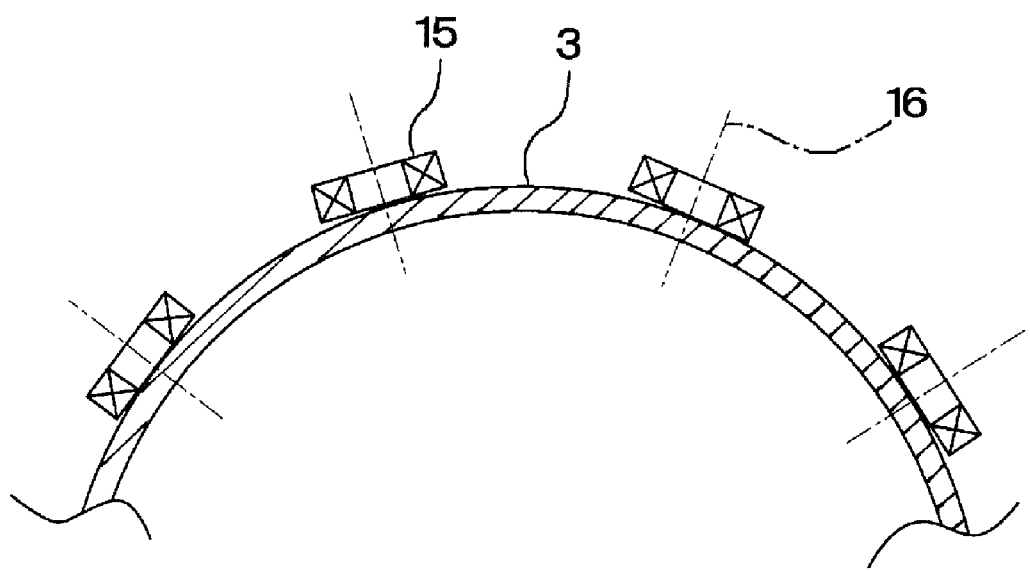

METHOD FOR MEASURING FLOW RATE FROM ELECTROMAGNETIC PUMP

TECHNICAL FIELD

The present invention relates to a method of measuring a flow rate of a conductive fluid that is discharged from an electromagnetic pump. More particularly, the present invention relates to a method of measuring a flow rate that is suitably used to measure a flow rate of a conductive fluid discharged from each electromagnetic pump, in an electromagnetic pump unit having the configuration where a plurality of electromagnetic pumps are arranged in parallel.

BACKGROUND ART

In general, as a method of measuring a flow amount of a conductive fluid, for example, a liquid metal, an electromagnetic flowmeter or an ultrasonic flowmeter is known. Outside a duct line, the electromagnetic flowmeter includes a magnet applying a magnetic field to a conductive fluid flowing through the duct line and an electrode detecting a current generated in the conductive fluid due to a flow of the conductive fluid linked with the magnetic field, and measures an electromotive force by a magnetic field applied in a direction orthogonal to a flow direction of the conductive fluid and an electric field generated in a direction orthogonal to any of the magnetic field direction and the flow direction, thereby measuring a flow amount. The ultrasonic flowmeter includes a transmitter and a receiver for an ultrasonic wave in piping, calculates a flow rate of a conductive fluid from a time until a signal arrival using a characteristic of a propagation rate of the ultrasonic wave being related to a flow rate of a fluid, and calculates a flow amount from a known section.

In a main circulation piping system of a fast breeder reactor, since an arrangement of an electromagnetic pump and a separate flowmeter is spatially restricted, it is proposed as a method of calculating a flow amount of the electromagnetic pump to measure a terminal voltage and an input current of a winding line of the electromagnetic pump, calculate input impedance based on a ratio of the input current and the terminal voltage, and calculate a flow amount of a conductive fluid from a previously calculated relationship between the input impedance and the flow amount of the conductive fluid (Patent Document 1)

PRIOR ART DOCUMENT

Patent Document

[Patent document 1] Japanese Patent No. 3285894

DISCLOSURE OF THE INVENTION

Problems to be Solved by the Invention

However, the electromagnetic flowmeter needs to include the magnet to generate the magnetic field and the electrode, which extracts the electromotive force generated in the duct line, in the piping. Also, the ultrasonic flowmeter needs to have a certain length of the piping to arrange an ultrasonic transceiver and needs to be processed to arrange the transmitter and the receiver in the piping. Thus, since a certain space for arrangement is required, the ultrasonic flowmeter is not suitable for measuring a sodium flow amount in a place that is spatially restricted, for example, in a facility, such as the fast breeder reactor. In particular, when a plurality of electromagnetic pumps each having a small capacity are arranged in parallel in one pump vessel to constitute an electromagnetic pump unit in order to avoid occurrence of magnetohydrodynamic instability due to an increase in capacity unique to an electromagnetic pump, it is difficult to accommodate the electromagnetic flowmeter or the ultrasonic flowmeter in the pump vessel to measure a flow amount of each electromagnetic pump.

In the method for measuring the flow amount of the sodium discharged from the electromagnetic pump of the fast breeder reactor disclosed in Patent document 1, since impedance as a physical amount that is not directly related to the flow amount is measured, the case where the flow amount cannot be measured or measurement precision is lowered is considered. That is, in general, even though the flow amount changes according to a change in voltage, the impedance does not necessarily change accordingly. Since a correlation between the flow amount and the impedance is not linear, a region where a change in the impedance is small with respect to a change in the flow amount exists. This means that the flow amount cannot be measured or the measurement precision is lowered, when only the impedance is calculated.

When a plurality of electromagnetic pumps are arranged in parallel, electric circuits of the individual electromagnetic pumps are generally connected in series in order to maintain developed pressures of the individual electromagnetic pumps to be equal. For this reason, when a channel of one electromagnetic pump is closed by a loose part, the flow amount of the electromagnetic pump is lowered. However, in the method disclosed in Patent document 1, an electromagnetic pump where a channel is closed and impedance is lowered cannot be identified.

Accordingly, it is an object of the present invention to provide a method of measuring a flow rate from an electromagnetic pump having reduced spatial restriction and that can simply measure a flow rate of a conductive fluid from the electromagnetic pump with high precision. In particular, it is an object of the present invention to provide a method of measuring a flow rate from an electromagnetic pump that is suitably used to measure a flow amount of each electromagnetic pump in an electromagnetic pump unit where a plurality of electromagnetic pumps are arranged in parallel in one pump vessel.

Means for Solving the Problems

In order to achieve the above objects, the inventors have conducted various studies and experiments. As a result, the inventors have discovered that a distorted magnetic field, that is, a leakage magnetic field exists to be pushed out from a outlet end of an electromagnetic pump in the vicinity of the outlet end, and a magnetic flux density of the leakage magnetic field increases or decreases depending on a flow amount of a conductive fluid. Also, the inventors have discovered that the flow rate and the flow amount of the electromagnetic pump can be measured using a correlative relationship between the flow amount of the conductive fluid and the magnetic flux density of the leakage magnetic field.

The present invention is based on the above discoveries and provides a method of measuring a flow rate of an electromagnetic pump, including: measuring, by a magnetic sensor arranged in the vicinity of an outlet end of the electromagnetic pump, a magnetic flux density of a magnetic field that is generated in the electromagnetic pump and is distorted as if it is pushed out from the outlet end of the electromagnetic pump due to a conductive fluid flow; and measuring a flow rate of the electromagnetic pump from a previously calculated relationship between the magnetic flux density of the magnetic field distorted as if it is pushed out from the outlet end of the electromagnetic pump and a flow rate of the conductive fluid.

The flow rate measuring method of the present invention is effective when it is applied to a single electromagnetic pump which is accommodated in one pump vessel. More preferably, the flow rate measuring method is applied to plural electromagnetic pumps arranged in parallel and accommodated in one pump vessel which forms a large-scale electromagnetic pump and the flow rate of each pump is measured with magnetic sensors arranged in each pump.

Preferably, the magnetic sensor is a magnetic flux density measuring coil that is wound coaxially around a duct in which the conductive fluid flows.

Preferably, the magnetic sensor is a magnetic flux density measuring pick-up coil that is placed on a duct in which the conductive fluid flows.

Effects of the Invention

According to the method of measuring the flow rate from the electromagnetic pump according to claim 1, since the magnetic flux density certainly corresponds to the change in the flow amount according to the change in the voltage, the flow amount can always be measured. In addition, since the relationship between the flow amount and the magnetic flux density is in a linear relationship, superior measurement precision can be expected. Further, since a large space is not needed due to a simple structure where the magnetic sensor is disposed in the vicinity of the outlet end of the electromagnetic pump, the arrangement is not affected by the spatial restriction. Accordingly, as compared with the existing electromagnetic flowmeter or the ultrasonic flowmeter, the spatial restriction is smaller and the structure is simpler.

Since the method only includes measuring the magnetic field in the vicinity of the outlet end of the electromagnetic pump, and calculating the flow amount using the previously calculated correlative relationship between the magnetic flux density and the flow amount, the entire measurement system can be very simply configured.

When the method of measuring the flow rate from the electromagnetic pump according to the present invention is applied to an electromagnetic pump that is configured as an electromagnetic pump having a large flow amount by arranging a plurality of electromagnetic pumps in parallel in one pump vessel, a flow amount can be measured for each electromagnetic pump. Therefore, it can be monitored whether a regular amount of discharge is made from each electromagnetic pump or an electromagnetic pump where a trouble is generated can be easily identified. Since a large space is not needed due to a simple structure where the magnetic sensor is arranged in the vicinity of the outlet end of the electromagnetic pump, the arrangement is not affected by the spatial restriction, when the invention is applied to an electromagnetic pump having a large flow amount where a plurality of electromagnetic pumps are arranged in parallel, for example, an electromagnetic pump for a fast breeder reactor.

According to the method according to claim 3, since the coil is wound around the duct line of the conductive fluid and the magnetic flux density is measured, the structure is simple and compact, the arrangement is easy, and the coil is suitably disposed around the electromagnetic pump. Since the magnetic flux density measuring coil is wound around the duct line and an average magnetic field in a circumferential direction is measured, even though magnetic field distributions are not axially symmetric due to assembly tolerance of the electromagnetic pump or thermal deformation of the duct line, a measurement error can be reduced by averaging measurement values.

According to the method according to claim 4, since the magnetic flux density measuring pick-up coil is used, the coils may be disposed around the duct line at an appropriate interval. Therefore, an arrangement space can be advantageously reduced as compared with the case where the coils are wound with respect to all circumferences of the duct line.

BRIEF DESCRIPTION OF THE DRAWINGS

FIG. 1 is a schematic diagram illustrating a state where a magnetic field is pushed out by a flow of liquid sodium in an annular duct line in the vicinity of a outlet end of an induction-type electromagnetic pump of a single stator type when the flow rate is low.

FIG. 2 is a schematic diagram illustrating a state where a magnetic field is pushed out by a flow of liquid sodium in an annular duct line in the vicinity of a outlet end of an induction-type electromagnetic pump of a single stator type when the flow rate is high.

FIG. 3 is a conceptual diagram for implementation of a method of measuring a flow rate from an electromagnetic pump according to the present invention, which illustrates the case where a magnetic flux density measuring coil is arranged around an annular duct line in the vicinity of a outlet end of an induction-type electromagnetic pump of a single stator type.

FIG. 4 is a conceptual diagram for implementation of a method of measuring a flow rate from an electromagnetic pump according to the present invention, which illustrates the case where a magnetic flux density measuring coil is arranged around an annular duct line in the vicinity of a outlet end of an induction-type electromagnetic pump of a double stator type.

FIG. 5 is a graph illustrating a relationship between a time average value of a magnetic flux density and a flow amount of liquid metal sodium when an induction-type electromagnetic pump of a single stator type having a rated flow amount of 7 m$^3$/min is operated at 50 Hz.

FIG. 6 is a graph illustrating a relationship between a time average value of a magnetic flux density and a flow amount of liquid metal sodium when an induction-type electromagnetic pump of a single stator type having a rated flow amount of 7 m$^3$/min is operated at 30 Hz.

FIG. 7 is a partially sectional perspective view illustrating a schematic structure of an induction-type electromagnetic pump of a single stator type having an annular channel.

FIG. 8 is a partially sectional perspective view illustrating a schematic structure of an induction-type electromagnetic pump of a double stator type having an annular channel.

FIG. 9 is a conceptual plan view illustrating the case where a plurality of electromagnetic pumps are arranged in parallel in one pump vessel to constitute an electromagnetic pump unit having a large flow amount.

FIG. 10 is a conceptual diagram illustrating the case where a plurality of electromagnetic pumps are arranged in parallel in one pump vessel to constitute an electromagnetic pump unit having a large flow amount, which is a perspective view viewed from the front side.

FIG. 11 is a conceptual diagram of an electromagnetic pump that is arranged in parallel to carry out the method of the present invention.

FIG. 12 is a diagram illustrating a measurement principle of a radial direction component Br of a magnetic flux density.

FIG. 15 is a diagram illustrating an arrangement example of a coil to measure a magnetic flux density Br of a radial direction component when a pick-up coil is used.

BEST MODE FOR CARRYING OUT THE INVENTION

Figure 13:
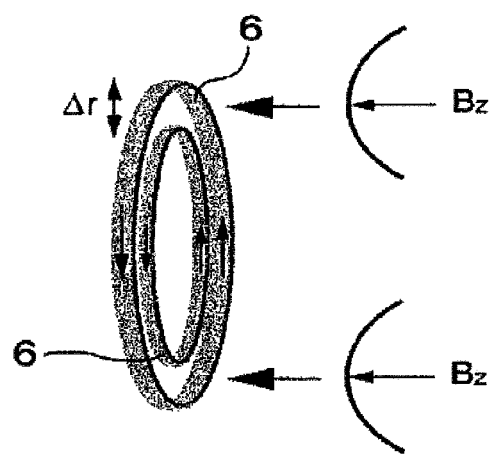
FIG. 13 is a diagram illustrating a measurement principle of an axial direction component Bz of a magnetic flux density.

Hereinafter, the configuration of the present invention will be described in detail based on embodiments illustrated in the drawings.

As representative examples of an electromagnetic pump that is implemented by the present invention, three-phase alternating current induction-type electromagnetic pumps each having an annular channel are illustrated in FIGS. 7 and 8. An electromagnetic pump 1 of FIG. 7 is an induction-type electromagnetic pump of a single stator type where a three-phase alternating current coil 9 is wound outside an annular channel (duct line) 3 composed of a double duct of an outside duct 3a and an inside duct 3b and liquid sodium flows through the annular channel in a direction shown by an arrow. An electromagnetic pump 1 of FIG. 8 is an induction-type electromagnetic pump of a double stator type where the three-phase alternating current coil 9 is also wound inside the annular channel 3. A method of measuring a flow rate from an electromagnetic pump according to the present invention can be applied to an electromagnetic pump of any type. The electromagnetic pump 1 causes an electromagnetic force to act on the liquid sodium by an induced current flowing through the liquid sodium due to a moving magnetic field generated by the three-phase alternating current coil and the moving magnetic field, thereby discharging the liquid sodium in the same direction as a moving direction of the magnetic field. In the drawings, reference numeral 17 denotes the induced current, reference numeral 18 denotes the magnetic field, reference numeral 19 denotes a coil current, reference numeral 20 denotes the moving direction of the magnetic field, and reference numeral 21 denotes a flow of sodium.

In the vicinity of a outlet end 2 of the electromagnetic pump 1, the magnetic field that is generated in the electromagnetic pump is distorted as if the magnetic field is pulled by a flow of a conductive fluid (hereinafter, referred to as liquid sodium) 5. That is, outside the induction-type electromagnetic pump 1, the magnetic field is pulled by a flow of a liquid metal electromagnetic fluid as if it was a direct-current magnetic field though the magnetic field is an alternating-current magnetic field. Therefore, the inventors has focused on the characteristic that a leakage magnetic field where the magnetic field 4 is pushed out of the electromagnetic pump 1 in the vicinity of the outlet end 2 of the electromagnetic pump 1 is more likely to occur as a flow rate of the liquid sodium is larger (refer to FIGS. 1 and 2). In this case, a broken line that is denoted by reference numeral 4 schematically illustrates a state where a magnetic force line 22 is pushed out by the flow of the liquid sodium 5 in the vicinity of the outlet end 2 of the electromagnetic pump 1, which illustrates the magnetic field 4 distorted to be pushed out from the outlet end 2, that is, the leakage magnetic field.

Accordingly, as illustrated in FIG. 3 or 4, a magnetic sensor, for example, a magnetic field measuring coil 6 is wound around a duct line 3 in the vicinity of the outlet end 2 of the electromagnetic pump 1 such that a temporal change of a magnetic flux density of the magnetic field 4 that is pushed out from the outlet end 2 of the electromagnetic pump 1 can be measured using a Faraday's law. According to the Faraday's law, the temporal change of the magnetic flux density is equal to a gradient (rotation in a strict sense) of an electromotive force (voltage). In this case, when a radial direction component of the magnetic flux density is measured, a plurality of magnetic field measuring coils 6 are arranged in an axial direction of the duct line 3, and a gradient in an axial direction of a circumferential direction component of the electromotive force (voltage) that is generated in each of the magnetic field measuring coils 6 is measured, as illustrated in FIG. 12. On the other hand, when the axial direction component of the magnetic flux density is measured, the plurality of magnetic field measuring coils 6 are arranged in the radial direction of the duct line 3, for example, in a concentric circle shape with spacers therebetween, and a gradient in a radial direction of the circumferential direction component of the electromotive force is measured, as illustrated in FIG. 13. According to the Faraday's law, the gradient of the electromotive force is proportional to the temporal change of the magnetic flux density. For this reason, the magnetic flux density may be calculated from the gradient of the electromotive force and calibration may be made by the magnetic flux density and the flow amount. In practice, however, the calibration may be made by the flow amount and the gradient of the electromotive force. As illustrated in FIGS. 3 and 4, when the magnetic flux density measuring coils 6 are wound around the annular channel 3 of the induction-type electromagnetic pump 1, the magnitude of the electromotive force is proportional to the magnitude of the magnetic flux density. For this reason, instead of the gradient of the electromotive force, the electromotive force may be measured and correlated with the flow amount. Alternatively, instead of measuring the electromotive force (voltage), a current that flows through the coil may be measured. In the description of the present invention, since a relationship between the flow amount of the conductive fluid and the magnetic flux density of the leakage magnetic field is used, in a physical relationship, the change in the flow amount of the conductive fluid appears as the change in the magnetic flux density of the leakage magnetic field, and the change in the magnetic flux density appears as the change in the gradient of the electromotive force. Accordingly, the relationship between the flow amount and the magnetic flux density becomes a more direct relationship as compared with the relationship between the flow amount and the gradient of the electromotive force. When a pick-up coil 15 is used, the flow amount and the magnetic flux density of the leakage magnetic field 4 are in a direct relationship, because the leakage magnetic field is directly measured. Accordingly, in this specification, in order that the present invention is intuitively and easily understood, for convenience of explanation, a measurement value of the gradient of the electromotive force may be converted into the magnetic flux density, and the description may be given using a relationship between the flow amount of the conductive fluid and the temporal change of the magnetic flux density of the leakage magnetic field between which a physical relationship is more direct.

In this case, the magnetic flux density measuring coil 6 is circumferentially wound around the duct line 3, through which the liquid sodium 5 flows, in the vicinity of the outlet end 2 of the electromagnetic pump 1 such that a coil axis center is arranged concentrically with an axis center O of the duct line 3. In the case of the electromagnetic pump according to this embodiment, the duct line 3 is composed of a double duct (an outside duct and an inside duct) to constitute an annular channel. Therefore, when the electromagnetic pump is the single stator type, the coil is preferably wound around an external surface of an outside duct wall whose magnetic field intensity is stronger than that of an external surface of an inside duct wall, as illustrated in FIG. 3. On the other hand, when the induction-type electromagnetic pump is the double stator type, since the intensity of the magnetic field is almost equal in the surfaces of the outside and inside duct walls, the magnetic flux density measuring coil may be provided in at least one of the external surfaces of the outside duct wall and the inside duct wall. In some cases, as illustrated in FIG. 4, the magnetic flux density measuring coils may be provided in both the external surface of the outside duct wall and the external surface of the inside duct wall. In the drawings, reference numeral 7 denotes a stator that constitutes the electromagnetic pump 1, reference numeral 8 denotes a core, reference numeral 9 denotes a coil, and reference numeral 10 denotes a gap.

When the gradient of the electromotive force is measured, at least two magnetic flux density measuring coils are needed. However, when the electromotive force is measured, at least one magnetic flux density measuring coil 6 is needed. However, in any cases, it is preferable that the number of coils be appropriately increased and an average value be calculated since there may be a variation in measurement values if the number of coils is small. The number of turns of the coil 6 may be any number, but it is sufficient in a range of about 1 to 3. The number of coils may also be any number, but it is sufficient in a range of 5 to 10. A region where the magnetic flux density measuring coil 6 is wound is preferably in a range outside the outlet end 2 of the electromagnetic pump 1 and in which the magnetic field 4 pushed out from the outlet end 2 of the electromagnetic pump 1 due to the flow of the liquid sodium 5 reaches. Accordingly, the magnetic flux density measuring coil 6 is preferably arranged in a range of about 50 mm to 100 mm from the outlet end 2 of the electromagnetic pump 1.

The sodium flow amount can be measured and monitored by measuring the magnetic field 4 that is pushed out from the outlet end 2 of the electromagnetic pump 1 increasing or decreasing depending on the sodium flow amount by the electromagnetic flux density measuring coil 6 that is arranged in the above manner. That is, the change in the magnetic flux density of the magnetic field 4 in the vicinity of the outlet end 2 of the electromagnetic pump 1 can be measured, and the flow amount of the electromagnetic pump 1 can be calculated from the previously calculated relationship (refer to FIGS. 5 and 6) between the magnetic flux density of the magnetic field 4 pushed out from the outlet end 2 of the electromagnetic pump 1 and the flow amount of the liquid sodium 5. In this case, the correlative relationship between the magnetic flux density of the magnetic field 4 pushed out from the electromagnetic pump 1 and the flow amount of the liquid sodium 5 can be previously calculated. For example, as embodied in first and second embodiments, the correlation can be readily calculated by actually measuring the flow amount of the liquid sodium by an electromagnetic flowmeter disposed in a test loop while measuring the magnetic flux density of the magnetic field 4 pushed out from the electromagnetic pump 1 at this time. The correlative relationship between the magnetic flux density of the magnetic field 4 pushed out from the outlet end 2 of the electromagnetic pump 1 and the flow amount of the liquid sodium, that is, the conductive fluid 5 at this time is calculated as a calibration curve, and an actual flow amount of the electromagnetic pump at the time of a rated operation can be calculated from the calibration curve. An operation situation of the electromagnetic pump can be monitored in a manner that the correlative relationship is represented by a function in some cases or in a form of a table and stored in a memory, and the flow amount is calculated based on a magnetic flux density calculated by a central processing unit from an induced current detected by the coil or in a manner that it is determined whether the electromagnetic pump discharges a rated flow amount. For example, the correlative relationship between the magnetic flux density of the leakage magnetic field 4 and the flow amount of the liquid sodium, that is, the conductive fluid 5 at this time is represented by a function or in the form of a table and previously stored in the memory, the change in the magnetic flux density of the magnetic field 4 pushed out from the outlet end 2 of the electromagnetic pump 1 is detected by the magnetic flux density measuring coil 6 that is provided in the vicinity of the outlet end 2 of the electromagnetic pump 1, and a discharge flow of the conductive fluid of the targeted electromagnetic pump is calculated based on the detected value of the magnetic flux density and the correlative relationship stored in the memory. By causing a computer to execute the calculation, the flow rate of the targeted electromagnetic pump can be measured or it can be simply monitored whether the electromagnetic pump is closed. These measuring method and apparatus can measure the flow rate of each electromagnetic pump of an electromagnetic pump of a parallel arrangement type that is constructed by arranging a plurality of electromagnetic pumps in parallel in one pump vessel or monitor whether each electromagnetic pump is closed. Further, it can be determined whether the variation generated from the change in the relative magnetic flux density between the plurality of electromagnetic pumps is due to each electromagnetic pump or a common factor.

The flow amount of the electromagnetic pump is determined according to the voltage and the operation frequency of the three-phase alternating current coil, and the magnetic flux density depends on electric conductivity of sodium, that is, the temperature. Accordingly, since the correlative relationship between the sodium flow amount and the magnetic flux density is determined by three parameters of the voltage, the operation frequency, and the temperature, a calibration curve can be calculated for each element. However, since it is needed to detect whether each electromagnetic pump discharges the rated flow amount at the time of the rated operation, only a calibration curve with respect to a rated operation condition may be used. Accordingly, at least one calibration curve with respect to the rated operation may be calculated in advance.

The method of measuring the flow rate from the electromagnetic pump according to the present invention can be applied to a pump where one electromagnetic pump is accommodated in one pump vessel. More preferably, the method of measuring an electromagnetic pump flow rate is applied to the case of measuring a flow rate from each electromagnetic pump in an electromagnetic pump unit where a plurality of electromagnetic pumps are arranged in parallel in one pump vessel so as to be used as one electromagnetic pump having a large flow amount. In this case, it can be determined whether the defined amount of discharge is made from each electromagnetic pump, and the electromagnetic pump where the channel is closed can be easily identified. For example, as illustrated in FIGS. 9, 10, and 11, the magnetic flux density measuring coil 6 is arranged outside a outlet end 2 of each of a plurality of electromagnetic pumps 1a, 1b, . . . , and 1f that are circumferentially arranged in parallel in one pump vessel 11 where argon gas 12 is sealed, thereby measuring the flow rate of each of the electromagnetic pumps 1a, 1b, . . . , and 1f. Both ends of the pump vessel 11 that surrounds the plurality of electromagnetic pumps 1a, 1b, . . . , and 1f are connected to headers 13 and 14, and annular duct lines 3 of the individual electromagnetic pumps 1a, 1b, . . . , and 1f are joined together and incorporated in a circulation path as one channel. In this case, electric circuits of the plurality of electromagnetic pumps 1a, 1b, ..., and 1f that are arranged in parallel are serially connected and provided to maintain a developed pressure of each of the electromagnetic pumps 1a, 1b, ..., and 1f to be equal.

Figure 14:
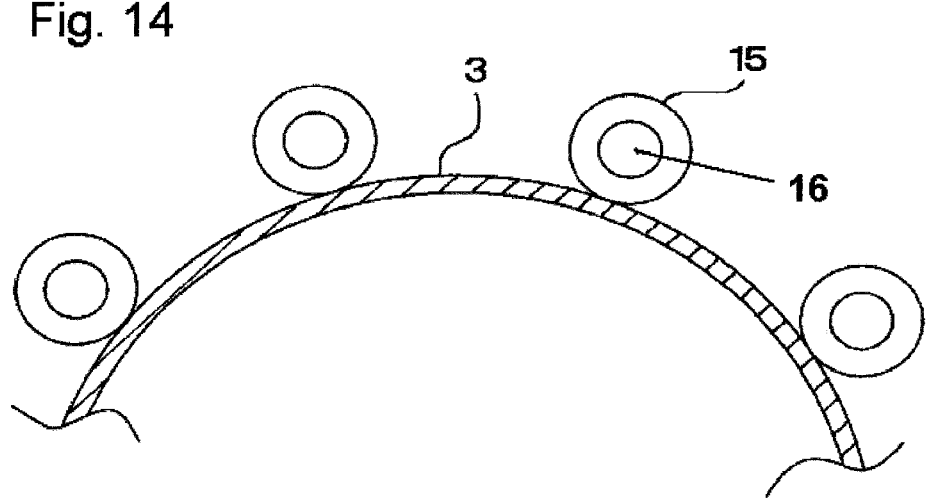
FIG. 14 is a diagram illustrating an arrangement example of a coil to measure a magnetic flux density Bz of an axial direction component when a pick-up coil is used.

The above embodiment is only one example of the preferred embodiments of the present invention. However, the present invention is not limited thereto, and various modifications can be made in a range without departing from the gist of the present invention. For example, a magnetic flux density B can be directly measured by using a magnetic flux density measuring pick-up coil 15 as the magnetic flux density measuring coil. When a magnetic flux density Bz of an axial direction component is measured, a coil axis center 16 of the pick-up coil 15 is placed around the duct line 3 in which the conductive fluid flows so as to be parallel to the axis center of the duct line 3, and the pick-up coil 15 is arranged around the duct line 3, as illustrated in FIG. 14. When a magnetic flux density Br of a radial direction component is measured, a coil axis center 16 of the pick-up coil 15 is placed in a radial direction of the duct line 3 to be orthogonal to the axis center of the duct line 3, and the pick-up coil 15 is arranged around the duct line 3, as illustrated in FIG. 15. The leakage magnetic field that is generated outside the outlet end of the electromagnetic pump 1 includes the radial direction component and the axial direction component, and the radial direction component and the axial direction component have the magnitude of the same order. Therefore, when the axial direction of the coil is oriented in a flow direction and when the axial direction is oriented in a direction orthogonal to the flow direction, the measured magnetic flux amounts are not largely different from each other. Accordingly, the direction of the pick-up coil 15 is not restricted to a specific direction. In this case, the magnetic flux density B (Br and Bz) of the magnetic filed that is pushed out from the outlet end 2 of the electromagnetic pump 1 is not in axial symmetry. That is, the magnetic flux density is not uniform in the circumferential direction. Accordingly, a plurality of pick-up coils are preferably arranged in the circumferential direction of the duct line 3.

Since the magnetic field that is pushed out from the outlet end 2 of the electromagnetic pump 1 is an alternating-current magnetic field, the case where the magnetic flux density measuring coil is used as the magnetic sensor has been exemplified. However, as long as the magnetic flux density can be measured, an element other than the coil may be used. Since a response speed of the magnetic sensor does not need to be high, an element using a Hall electromotive force or an element using a change in electric resistance due to the magnetic field may be used as the magnetic sensor, as long as a condition of a use temperature of the magnetic sensor is satisfied (the temperature of conductive fluid is generally high). Also, an element using an influence of polarization of light by a Faraday effect using an optical fiber may be used as the magnetic sensor.

EXAMPLES

First Example

An induction-type electromagnetic pump of a single stator type where a rated flow amount was 7 m$^3$/min was operated at 50 Hz, a discharge flow amount was changed in a relatively high flow amount zone (range of 5.7 to 7 m$^3$/min), a magnetic flux density in the vicinity of the outlet end 2 at this time was measured, and a relationship between a flow amount of the liquid sodium 5 and the magnetic flux density in the vicinity of the outlet end 2 of the electromagnetic pump was calculated. A coil having the number of turns of 1 was used as the magnetic flux density measuring coil 6, eleven magnetic flux density measuring coils were arranged in a duct wall outside the duct line 3 at the side of the outlet end 2 of the electromagnetic pump 1 at an interval of 7.5 mm to 8.5 mm over a region of 76 mm from the outlet end 2, and the magnetic flux density was measured. The flow amount of the liquid sodium 5 was measured by the electromagnetic flowmeter that was disposed in the test loop.

A relationship between a measurement value of the magnetic flux density and the flow amount of the liquid sodium 5 measured by the electromagnetic flowmeter in this case is illustrated in FIG. 5. As apparent from FIG. 5, a correlative relationship between the flow rate of the liquid sodium and the magnetic flux density becomes a linear relationship. Accordingly, the magnetic flux density measuring coil 6 is arranged around the duct line 3 in the vicinity of the outlet end 2 of the electromagnetic pump 1 to measure the magnetic flux density of the magnetic field that is pushed out from the electromagnetic pump 1 by the liquid sodium 5 flowing through the duct line 3, and thereby the flow amount of the liquid sodium that is discharged from the electromagnetic pump 1 can be calculated using the above-described correlative relationship. The magnetic flux density illustrated in FIG. 5 is a time average value of the magnetic flux density measurement values measured by the eleven magnetic flux density measuring coils 6. When the eleven coils having the number of turns of 1 are arranged, a phase of a current (or voltage) that is generated in each of the coils is different for each coil in a strict sense. However, since the maximal length of the region where the magnetic field is measured is about 100 mm which is shorter than the pole pitch, the phase is not greatly different. Since the magnetic field is attenuated outside the stator region, even when the electric circuits of the electromagnetic pumps are connected in series, the electric circuits are greatly affected by the electromotive force (or current) of the coils near the stator. Accordingly, an average value of the measurement values in the individual coils may be calculated. A span where a time average is calculated may be a half cycle at the minimum. However, in a large-scale pump, since a frequency is about 20 Hz, at the time of an actual measurement, an average value of several cycles is measured for each time and a time average is calculated.

Second Example

An induction-type electromagnetic pump of a single stator type where a rated flow amount was 7 m$^3$/min was operated at 30 Hz, and a discharge flow amount was changed in a relatively low flow amount zone (range of 3.2 to 4.7 m$^3$/min). A relationship between the flow amount of the liquid sodium and the magnetic flux density in the vicinity of the outlet end of the electromagnetic pump in this case was calculated. The arrangement positions, the arrangement interval, the arrangement number, and the form of the magnetic flux density measuring coils 6 were the same as those in the first example.

The relationship between the measurement value of the magnetic flux density and the flow amount of the liquid sodium measured by the electromagnetic flowmeter in this case is illustrated in FIG. 6. In this experiment, the flow amount of the liquid sodium was in a range of a relatively low flow amount zone with respect to the rated flow amount, but the electromagnetic pump was able to be stably operated by decreasing the operation frequency thereof to 30 Hz. For this reason, a distribution of the magnetic field was uniform in a circumferential direction, and linearity was obtained in the correlation between the sodium flow amount and the magnetic flux density. That is, in a region where the electromagnetic pump can be stably operated, even in the region where the flow amount is relatively small, the correlative relationship between the flow amount of the liquid sodium and the magnetic flux density indicates a linear relationship, as illustrated in FIG. 6. On the other hand, in a region where the electromagnetic pump is unstably operated, the distribution of the magnetic field is not uniform in the circumferential direction, and there is no linearity in the correlation between the sodium flow amount and the magnetic flux density.

DESCRIPTION OF REFERENCE NUMERALS

1: electromagnetic pump
2: outlet end of electromagnetic pump
3: annular channel
4: magnetic field (magnetic force line) pushed out from outlet end of electromagnetic pump
5: conductive fluid
6: magnetic flux density measuring coil
15: pick-up coil

The invention claimed is:

1. A method of measuring a flow rate of an electromagnetic pump, the method comprising:
   measuring, by a magnetic sensor arranged in the vicinity of an outlet end of the electromagnetic pump, a magnetic flux density of a magnetic field that is generated in the electromagnetic pump and is distorted as if it is pushed out from the outlet end of the electromagnetic pump due to a conductive fluid flow; and
   measuring a flow rate of the electromagnetic pump from a previously calculated relationship between the magnetic flux density of the magnetic field distorted as if it is pushed out from the outlet end of the electromagnetic pump and a flow rate of the conductive fluid.

2. The method according to claim 1,
   wherein the electromagnetic pump comprises of plural electromagnetic pumps arranged in parallel in one pump vessel, and
   the magnetic sensor is arranged in each electromagnetic pump to measure the magnetic flux density of the magnetic field that is generated in each electromagnetic pump and is distorted as if it is pushed out from the outlet end of each electromagnetic pump due to the conductive fluid flow.

3. The method according to claim 1,
   wherein the magnetic sensor is a magnetic flux density measuring coil that is wound coaxially around a duct in which the conductive fluid flows.

4. The method according to claim 1,
   wherein the magnetic sensor is a magnetic flux density measuring pick-up coil that is placed on a duct in which the conductive fluid flows.

* * * * *